(12) United States Patent
Yoshikawa et al.

(10) Patent No.: US 6,259,895 B1
(45) Date of Patent: Jul. 10, 2001

(54) RECEIVER AND TRANSMITTER-RECEIVER

(75) Inventors: Yoshishige Yoshikawa, Ibaraki; Yoshio Horiike, Shijonawate; Hisashi Adachi, Mino; Hiroaki Kosugi, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/141,854

(22) Filed: Aug. 28, 1998

(30) Foreign Application Priority Data

Sep. 5, 1997 (JP) .................................................. 9-241423

(51) Int. Cl.$^7$ ................................ H04B 1/38; H04B 1/26
(52) U.S. Cl. .............................. 455/73; 455/77; 455/314; 455/182.3; 455/76
(58) Field of Search .................................. 455/73, 76, 77, 455/182.3, 182.2, 192.3, 207, 255, 257, 260, 179.1, 84, 314, 318

(56) References Cited

U.S. PATENT DOCUMENTS

| | | | |
|---|---|---|---|
| 4,127,822 | * | 11/1978 | Mogi et al. ........................ 455/182.3 |
| 4,521,916 | * | 6/1985 | Wine .................................. 455/182.1 |
| 4,580,289 | * | 4/1986 | Enderby .............................. 455/314 |
| 4,977,613 | * | 12/1990 | Holcomb, Sr. et al. ........... 455/182.3 |
| 5,073,973 | * | 12/1991 | Ylivakeri ............................. 455/76 |
| 5,108,334 | * | 4/1992 | Eschenbach et al. .............. 455/314 |
| 5,163,160 | * | 11/1992 | Foucher et al. .................... 455/76 |
| 5,230,094 | * | 7/1993 | Kitching et al. .................. 455/183.2 |
| 5,548,831 | * | 8/1996 | Bijker et al. ...................... 455/207 |
| 5,606,736 | * | 2/1997 | Hasler et al. ..................... 455/314 |
| 5,812,591 | * | 9/1998 | Shumaker et al. ................. 375/206 |
| 5,819,161 | * | 10/1998 | Saito .................................. 455/86 |
| 5,825,813 | * | 10/1998 | Na ..................................... 375/219 |
| 5,832,375 | * | 11/1998 | Leisten et al. ..................... 455/314 |
| 5,862,181 | * | 1/1999 | Ishizuka ............................. 375/259 |
| 5,898,907 | * | 4/1999 | Maruyama ......................... 455/76 |
| 5,937,335 | * | 8/1999 | Park et al. .......................... 455/86 |
| 5,953,641 | * | 9/1999 | Auvray ............................... 455/74 |
| 5,966,666 | * | 10/1999 | Yamaguchi et al. ............... 455/552 |
| 5,999,824 | * | 12/1999 | Na ..................................... 455/553 |
| 6,016,422 | * | 1/2000 | Bartusiak ........................... 455/76 |

* cited by examiner

Primary Examiner—Nguyen T. Vo
Assistant Examiner—Charles N. Appiah
(74) Attorney, Agent, or Firm—Smith, Gambrell & Russell, LLP

(57) ABSTRACT

In the receiver using a PLL synthesizer, there is a limit in reducing boot-up time or frequency switching time, which shortens battery life.

A first local frequency L01 from a multiplier 22 and a receiving signal are input to a first frequency converter 10 to convert it to a first intermediate frequency IF1. The first intermediate frequency IF1 is converted in a second frequency converter 12 by a frequency L02 of an N1 frequency divider 24 to a second intermediate frequency IF2. Also, the outputs of the N1 frequency divider 24 and N2 frequency divider 26 are mixed in the frequency converter for transmission 34, and L04 and the local frequency L01 are added to a lower-side-band cancel mixer 50 to extract the upper side band of the transmission frequency. With the configuration in which a frequency may be varied by one channel interval by varying the frequency division number of the N1 frequency divider 24 by one, switching of frequency division number permits channel switching for both transmission and reception.

16 Claims, 5 Drawing Sheets

RECEIVER AND TRANSMITTER-RECEIVER

BACKGROUND OF THE INVENTION

1. Field of the Invention

The present invention principally relates to a radio that performs transmission of data between equipment, and, more particularly, to a receiver and transmitter-receiver well suited for applications, such as a pager, a cordless remote control, a cordless telephone and a telemeter, that involve repeating intermittent reception or switching of receiving channels.

2. Description of the Related Art

In recent years, communication data transmission using a radio of the type that performs intermittent reception and transmission or frequently repeats switching of transmitting and receiving channels for effective use of both limited radio wave resources and power sources is largely used in, for example, a pager, a cordless remote control, a cordless telephone and a telemeter.

Such a conventional transmitter-receiver of the type that performs intermittent reception or frequently repeats switching of several receiving channels will be described by means of the drawings. FIG. 5 is a block diagram showing the configuration of a conventional transmitter-receiver. An antenna 100 to which a radio-frequency signal is input is coupled to the common contact 102a of a switch 102, and a receiving contact 102b of the switch 102 is coupled through a radio-frequency filter 104 composed of a band-pass filter such as an SAW or LC filter for rejecting signals in an unnecessary band to a receiving radio-frequency amplifier 106. The output of the receiving radio-frequency amplifier 106 is coupled to a frequency converter 108, to which the output of a PLL synthesizer 110 is also coupled. The output of the frequency converter 108 is coupled through an intermediate frequency filter 122 that rejects signals in an unnecessary band as in the radio-frequency filter 104 and a demodulation circuit 124 to a demodulation data output terminal 126.

In a PLL synthesizer 110, the output of a voltage control oscillator (VCO) 116 is input to a variable frequency divider 118. The variable frequency divider 118 divides a frequency of an input signal by N for output. A frequency division ratio is then preset to a predetermined value. The output of the variable frequency divider 118 is input to a phase comparator 112 that performs phase comparison with the output of a reference signal source 120 and outputs a signal depending on the magnitude of the phase difference, wherein the output of the phase comparator 112 is input through a low-pass filter 114 that rejects radio-frequency components to a control terminal of the voltage control oscillator 116. If a frequency of the reference signal source 120 is selected as a channel interval frequency, a frequency of the voltage control oscillator 116 may be varied by one channel each time a frequency division number of the variable frequency divider 118 is varied by 1. Thus setting a frequency division number respectively may output a frequency corresponding to any channel frequency. A crystal oscillator may be used as a reference signal source 120 or a frequency divided signal of the output of a crystal oscillator may be used for radio-frequency stability.

A modulation data input terminal 128 to which modulation data is input is coupled through a modulation signal generator 130 to the PLL synthesizer 110, and the output of a modulation signal generator 130 is also coupled through the reference signal source 120 to the PLL synthesizer 110. The output of the PLL synthesizer 110 is coupled through a transmission radio-frequency amplifier 132 to the transmission contact 102c of the switch 102.

Operation of the transmitter-receiver thus configured during reception will now be described. A radio-frequency signal input to the antenna 100 passes from the common contact 102a of the switch 102 through receiving contact 102b to a radio-frequency filter 104 where signals in an unnecessary band are rejected and amplified by the receiving radio-frequency amplifier 106 to input to the frequency converter 108. On the other hand, the output frequency of the PLL synthesizer 110 is set to a somewhat higher or lower frequency with respect to a radio-frequency signal to be received. The output of the PLL synthesizer 110 is input to the frequency converter 108 where it is mixed to output an intermediate frequency signal which is a difference between the frequencies, signals in an unnecessary band are rejected by an intermediate frequency filter 122 before demodulation is performed by demodulation circuit 124, demodulation data is output from the demodulation data output terminal 126.

Operation during transmission will now be described. The modulation data input to the modulation data input terminal 128 is input to the modulation signal generator 130 where the PLL synthesizer 110 is modulated according to the modulation data, and a signal is generated for modulating a frequency of the PLL synthesizer 110 through the reference signal source 120. The modulation output of the PLL synthesizer 110 thus modulated is amplified by the transmission radio-frequency amplifier 132 and passed through the common contact 102a of the switch 102 that is switched to the transmission contact 102c to be output from the antenna 100.

However, a problem with such a conventional receiver using a PLL synthesizer 110 is that the use of a feedback loop for control to obtain a predetermined frequency requires some time for boot-up operation of powering and frequency switching. Boot-up time and switching time of frequency are characterized by a natural angular frequency of the feedback loop of the PLL. Setting a large natural angular frequency may reduce time required in boot-up operation of powering and frequency switching. However, due to the constraints of setting a signal at a channel interval corresponding to each channel and that of C/N or spurious characteristics, it is difficult to have a sufficiently large natural angular frequency. Therefore, the comparison frequency of the phase comparator must be equal to the channel frequency interval or less due to the constraint of setting a signal at a channel interval corresponding to each channel, large loop gain may not be obtained. For this reason, a conventional receiver using a PLL synthesizer has limits to reduce boot-up operation time and frequency switching time and sufficient characteristics may not be obtained to meet these demands.

Since a pager, a cordless remote control, a cordless telephone and a telemeter often involve repeating intermittent transmission and reception or switching of transmitting and receiving channels and employ a battery as a power source, however, boot-up time of frequency switching will become longer, leading to reduced battery life and lowered commercial value.

SUMMARY OF THE INVENTION

The present invention is to solve such a conventional problem as described above and aimed to provide a receiver and transmitter-receiver that achieves boot-up operation during powering and frequency switching in a short time.

The first invention of the present invention is a receiver that performs reception by selecting any of a plurality of equally set channels, comprising an oscillation means for oscillating a signal at a certain frequency; a first frequency conversion means for getting a received radio-frequency signal an output signal of said oscillation means to convert the received radio-frequency signal to a first intermediate frequency signal; a frequency division means for dividing the signal frequency of said oscillation means by a factor of N; a second frequency conversion means for getting said first intermediate frequency signal and the output signal of said frequency division means to output a second intermediate frequency signal; and a demodulation means for demodulating said second intermediate frequency signal; wherein the frequency division number N of said frequency division means and the frequency of the output signal of said oscillation means are predetermined so that a change in frequency of the output signal of said frequency division means due to a change in said frequency division number N by a predetermined number is the same as said channel interval and this frequency division number causes said second intermediate frequency signal to be at a predetermined frequency.

According to this configuration, it is possible to provide a receiver that achieves boot-up operation during powering and frequency switching in a short time and gives longer life of a battery, if used.

The second invention of the present invention is a receiver that performs reception by selecting any of a plurality of equally set channels, comprising: an oscillation means for oscillating a signal at a certain frequency; a multiplication means for multiplying the output signal of the oscillation means by a factor of a predetermined multiplication number; a first frequency conversion means for getting a received radio-frequency signal an output signal of said multiplication means to convert the received radio-frequency signal to a first intermediate frequency signal; a frequency division means for dividing the signal frequency of said oscillation means by a factor of N; a second frequency conversion means for getting said first intermediate frequency signal and the output signal of said frequency division means to output a second intermediate frequency signal; and a demodulation means for demodulating said second intermediate frequency signal; wherein the frequency division number N of said frequency division means and the frequency of the output signal of said oscillation means are predetermined so that a change in frequency of the output signal of said frequency division means due to a change in said frequency division number N by a predetermined number is the same as said channel interval and this frequency division number causes said second intermediate frequency signal to be at a predetermined frequency.

According to this configuration, in addition to the advantage of the configuration of the first invention, there is another advantage that it lowers power consumption of a frequency divider and gives longer service life of a battery, if used.

The third invention of the present invention is a receiver according to the first invention wherein a crystal oscillator is used as an oscillation means.

The fourth invention of the present invention is a receiver according to the first invention further comprising a frequency fine-tuning means for fine-tuning of an oscillation frequency of the oscillation means.

The fifth invention of the present invention is a receiver according to the fourth invention wherein the frequency fine-tuning means has a variable-capacitance semiconductor device and performs fine-tuning of oscillation frequency by applying an analog signal to which a digital signal is converted.

According to this configuration, fine-tuning of a receiving frequency in the configuration of the first invention to a specified receiving channel frequency can be easily performed.

The sixth invention of the present invention is a receiver according to the second invention wherein a crystal oscillator is used as an oscillation means.

The seventh invention of the present invention is a receiver according to the second invention further comprising a frequency fine-tuning means for fine-tuning of an oscillation frequency of the oscillation means.

The eighth invention of the present invention is a receiver according to the seventh invention wherein the frequency fine-tuning means has a variable-capacitance semiconductor device and performs fine-tuning of oscillation frequency by applying an analog signal to which a digital signal is converted.

According to this configuration, fine-tuning of a receiving frequency in the configuration of the second invention to a specified receiving channel frequency can be easily performed.

The ninth invention of the present invention is a transmitter-receiver that performs transmission and reception by selecting any of a plurality of equally set channels, comprising: an oscillation means for oscillating a signal at a certain frequency; a first frequency conversion means for getting a received radio-frequency signal an output signal of said oscillation means to convert the received radio-frequency signal to a first intermediate frequency signal; a first frequency division means for dividing the signal frequency of said oscillation means by a factor of N1; a second frequency division means for dividing the signal frequency of said oscillation means by a factr of N2; a second frequency conversion means for getting said first intermediate frequency signal and the output signal of said first frequency division means to output a second intermediate frequency signal; a demodulation means for demodulating said second intermediate frequency signal; a first frequency conversion means for transmission for getting the output signal of said first frequency division means and the output signal of said second frequency division means to output intermediate frequency signal for transmission; and a second frequency conversion means for transmission for getting the output signal of said oscillation means and the output signal of said first frequency conversion means for transmission to output a radio-frequency signal for transmission; wherein the frequency division number N1 of said first frequency division means and the frequency of the output signal of said oscillation means are predetermined so that a change in frequency of the output signal of said first frequency division means due to a change in said frequency division number N1 by a predetermined number is the same as said channel interval and this frequency division number causes said second intermediate frequency signal to be at a predetermined frequency, and wherein the frequency division number N2 of said second frequency division means is predetermined so that said radio-frequency signal for transmission is at a predetermined frequency.

According to this configuration, it is possible to provide a transmitter-receiver that achieves boot-up operation during powering and frequency switching in a short time and gives longer life of a battery, if used.

The tenth invention of the present invention is a transmitter-receiver that performs transmission and reception by selecting any of a plurality of equally set channels, comprising: an oscillation means for oscillating a signal at a certain frequency; a multiplication means for multiplying the output signal of the oscillation means by a factor of a predetermined multiplication number; a first frequency conversion means for getting a received radio-frequency signal an output signal of said multiplication means to convert the received radio-frequency signal to a first intermediate frequency signal; a first frequency division means for dividing the signal frequency of said oscillation means by a factor of N1; a second frequency division means for dividing the signal frequency of said oscillation means by a factor of N2; a second frequency conversion means for getting said first intermediate frequency signal and the output signal of said first frequency division means to output a second intermediate frequency signal; a demodulation means for demodulating said second intermediate frequency signal; a first frequency conversion means for transmission for getting the output signal of said first frequency division means and the output signal of said second frequency division means to output intermediate frequency signal for transmission; and a second frequency conversion means for transmission for getting the output signal of said multiplication means and the output signal of said first frequency conversion means for transmission to output a radio-frequency signal for transmission; wherein the frequency division number N1 of said first frequency division means and the frequency of the output signal of said oscillation means are predetermined so that a change in frequency of the output signal of said first frequency division means due to a change in said frequency division number N1 by a predetermined number is the same as said channel interval and this frequency division number causes said second intermediate frequency signal to be at a predetermined frequency, and wherein the frequency division number N2 of said second frequency division means is predetermined so that said radio-frequency signal for transmission is at a predetermined frequency.

According to this configuration, in addition to the advantage of the configuration of the ninth invention, there is another advantage that it lowers power consumption of a first and a second frequency dividers and gives longer service time of a battery, if use.

The eleventh invention of the present invention is a transmitter-receiver that performs transmission and reception by selecting any of a plurality of equally set channels, comprising: an oscillation means for oscillating a signal at a certain frequency; a first frequency conversion means for getting a received radio-frequency signal an output signal of said oscillation means to convert the received radio-frequency signal to a first intermediate frequency signal; a frequency division means for dividing the signal frequency of said oscillation means by a factor of N; a second frequency conversion means for getting said first intermediate frequency signal and the output signal of said frequency division means to output a second intermediate frequency signal; a demodulation means for demodulating said second intermediate frequency signal; and a frequency conversion means for transmission for getting the output signal of said oscillation means and the output signal of said frequency division means to output radio-frequency signal for transmission; wherein the frequency division number N of said frequency division means and the frequency of the output signal of said oscillation means are predetermined so that a change in frequency of the output signal of said frequency division means due to a change in said frequency division number N by a first predetermined number is the same as the transmitting channel interval and this frequency division number causes said radio-frequency signal for transmission to be at a predetermined frequency, and wherein the frequency division number N of said frequency division means is predetermined so that a change in frequency of the output signal of said frequency division means due to a change in said frequency division number N by a second predetermined number is the same as the receiving channel interval, wherein said frequency division number differs from during transmission and during reception.

According to this configuration, in addition to the advantage of the configuration of the ninth invention, there is another advantage that it uses a single frequency divider, requires no frequency converter for transmission or large-sized filter, and it is suitable for use in an integrated circuit.

The twelfth invention of the present invention is a transmitter-receiver that performs transmission and reception by selecting any of a plurality of equally set channels, comprising: an oscillation means for oscillating a signal at a certain frequency; a multiplication means for multiplying the output signal of the oscillation means by a factor of a predetermined multiplication number; a first frequency conversion means for getting a received radio-frequency signal an output signal of said multiplication means to convert the received radio-frequency signal to a first intermediate frequency signal; a first variable frequency division means for dividing the signal frequency of said oscillation means by a factor of N1; a fixed frequency division means for dividing the output signal of said multiplication means by a factor of an integral number; a second variable frequency division means for dividing the output of said fixed frequency division means by a factor of N2; a second frequency conversion means for getting said first intermediate frequency signal and the output signal of said first variable frequency division means to output a second intermediate frequency signal; a demodulation means for demodulating said second intermediate frequency signal; and a frequency conversion means for transmission for getting the output signal of said oscillation means and the output signal of said second variable frequency division means to output radio-frequency signal for transmission; wherein the frequency division number N2 of said second variable frequency division means and the frequency of the output signal of said oscillation means are predetermined so that a change in frequency of the output signal of said second variable frequency division means due to a change in said frequency division number N2 by a second predetermined number is the same as the transmitting channel interval and this frequency division number causes said radio-frequency signal for transmission to be at a predetermined frequency, and wherein the frequency division number N1 of said first variable frequency division means is predetermined so that a change in frequency of the output signal of said first variable frequency division means due to a change in said frequency division number N1 by a first predetermined number is the same as the receiving channel interval, wherein the frequency division numbers of said first and second variable frequency division means differ from during transmission and during reception.

According to this configuration, in addition to the advantage of the configuration of the ninth invention, it is possible to provide a configuration that requires no frequency converter for transmission or large-volume low-frequency filter, reduces an amount of current consumed, and has low volume and is suitable for use in an integrated circuit.

The thirteenth invention of the present invention is a transmitter-receiver according to the ninth invention wherein a crystal oscillator is used as an oscillation means.

The fourteenth invention of the present invention is a transmitter-receiver according to the ninth invention further comprising a frequency fine-tuning means for fine-tuning of an oscillation frequency of the oscillation means.

The fifteenth invention of the present invention is a transmitter-receiver according to the fourteenth invention wherein the frequency fine-tuning means has a variable-capacitance semiconductor device and performs fine-tuning of oscillation frequency by applying a digital signal converted to an analog signal.

According to this configuration, fine-tuning of a receiving frequency or transmitting frequency in the configuration of the ninth invention to a specified channel frequency can be easily performed.

The sixteenth invention of the present invention is a transmitter-receiver according to the tenth invention wherein a crystal oscillator is used as an oscillation means.

The seventeenth invention of the present invention is a transmitter-receiver according to the tenth invention further comprising a frequency fine-tuning means for fine-tuning of an oscillation frequency of the oscillation means.

The eighteenth invention of the present invention is a transmitter-receiver according to the seventeenth invention wherein the frequency fine-tuning means has a variable-capacitance semiconductor device and performs fine-tuning of oscillation frequency by applying a digital signal converted to an analog signal.

According to this configuration, fine-tuning of a receiving frequency or transmitting frequency in the configuration of the tenth invention to a specified channel frequency can be easily performed.

The nineteenth invention of the present invention is a transmitter-receiver according to the eleventh invention wherein a crystal oscillator is used as an oscillation means.

The twentieth invention of the present invention is a transmitter-receiver according to the eleventh invention further comprising a frequency fine-tuning means for fine-tuning of an oscillation frequency of the oscillation means.

The twenty-first invention of the present invention is a transmitter-receiver according to the twentieth invention wherein the frequency fine-tuning means has a variable-capacitance semiconductor device and performs fine-tuning of oscillation frequency by applying a digital signal converted to an analog signal.

According to this configuration, fine-tuning of a receiving frequency or transmitting frequency in the configuration of the eleventh invention to a specified channel frequency can be easily performed.

The twenty-second invention of the present invention is a transmitter-receiver according to the twelfth invention wherein a crystal oscillator is used as an oscillation means.

The twenty-third invention of the present invention is a transmitter-receiver according to the twelfth invention further comprising a frequency fine-tuning means for fine-tuning of an oscillation frequency of the oscillation means.

The twenty-fourth invention of the present invention is a transmitter-receiver according to the twenty-third invention wherein the frequency fine-tuning means has a variable-capacitance semiconductor device and performs fine-tuning of oscillation frequency by applying a digital signal converted to an analog signal.

According to this configuration, fine-tuning of a receiving frequency or transmitting frequency in the configuration of the twelfth invention to a specified channel frequency can be easily performed.

DETAILED DESCRIPTION OF THE PREFERRED EMBODIMENTS

This invention will be described below with reference to drawings showing its embodiments.

(First Embodiment)

Figure 1:
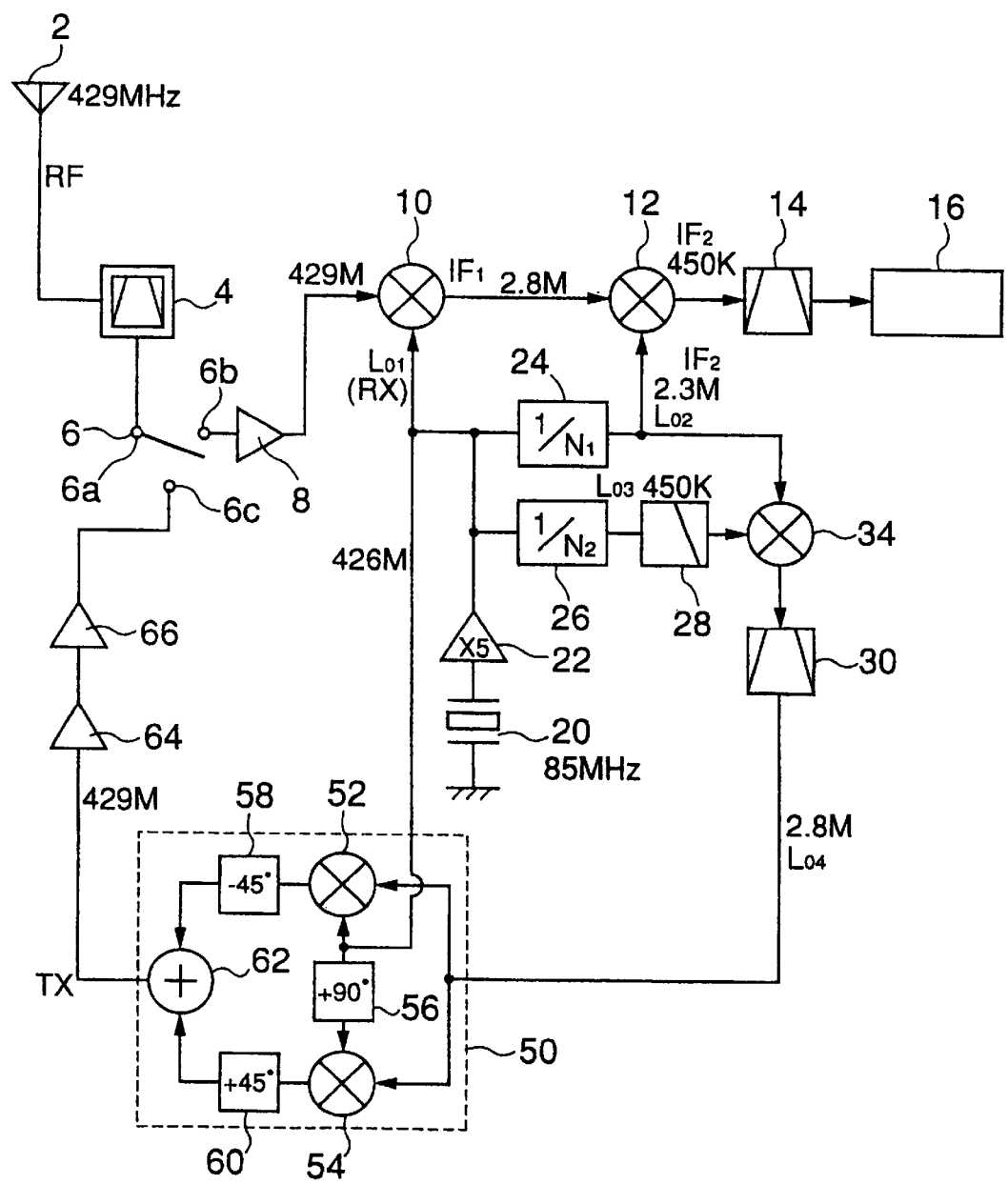
FIG. 1 is a block diagram showing a transmitter-receiver of a first embodiment according to this invention.

First embodiment according to this invention will be described below with reference to the drawings using an example of a transmitter-receiver with six channels from 429.175 MHz at an inter-channel frequency interval of 12.5 kHz in the 429 MHz band. FIG. 1 is a block diagram of a transmitter-receiver in this embodiment.

In FIG. 1, an antenna 2 for both transmission and reception is coupled through a band-pass filter 4 that permits passage of transmission-reception band to the common contact 6a of a transmission-reception selection switch 6, a receiving contact 6b of which is coupled through a receiving radio-frequency amplifier 8 to the input of a first frequency converter 10 that is a first frequency conversion means, the output of which is coupled to the input of a second frequency converter 12 that is a second frequency conversion means. The output of the second frequency converter 12 is input through a band-pass filter 14 using a ceramic filter that permits passage of the output signal to a demodulator 16 as a demodulation means that demodulates a receiving signal.

On the other hand, the output of a crystal oscillator 20 with a fundamental oscillation frequency on the order of 85 MHz is input to a multiplier 22 for multiplying by a factor of 5 and the output L01 of the multiplier 22 is input to a first frequency converter 10 as well as an N1 frequency divider 24 that is a first frequency division means and an N2 frequency divider 26 that is a second frequency division means. In this embodiment, the crystal oscillator 20 and the multiplier 22 compose an oscillation means. The output of the N1 frequency divider 24 is input to a second frequency converter 12 as well as a frequency converter for transmission 34 that is a first frequency conversion means for transmission, and the output L03 of the N2 frequency divider 26 is input through a low-pass filter 28 that rejects harmonics components to the frequency converter for transmission 34.

The output of the frequency converter for transmission 34 is input through a band-pass filter 30 that rejects L02 and other unnecessary components to a lower-side-band cancel mixer 50 that serves as a second frequency conversion means for transmission for suppressing lower-side-band and L01 components. This input is added to a frequency converters 52 and 54, and the output of the multiplier 22 is added to the other input of the frequency converter 52 as well as the other input of the frequency converter 54 through a +90 degree phase shifter 56. The output of the frequency converter 52 is added through a −45 degree phase shifter 58 to an adder 62, and the output of the frequency converter 54 is added through a +45 degree phase shifter 60 to the adder 62. The output of upper-side-band components of the lower-side-band cancel mixer 50 is coupled through transmission radio-frequency amplifiers 64, 66 to the transmission contact 6c of the switch 6 and passed through the band-pass filter 4 that rejects the remaining LO1, lower-side-band and other spurious components to be transmitted from the antenna 2. In this embodiment, it is a primary purpose to describe a method for generating carrier waves, and so the configuration of the modulation circuit for transmission is omitted.

Operation of the transmitter-receiver in this embodiment thus configured will be described with reference to the drawings.

During reception, the common contact 6a of the switch 6 is coupled to the receiving contact 6b. The radio-frequency signal in 429 MHz band from the antenna 2 is allowed only to pass a frequency band to be received by the band-pass filter 4 and amplified by the receiving radio-frequency amplifier 8 before it is input to the first frequency converter 10. Since an oscillation frequency on the order of 85 MHz of the crystal oscillator 20 which is multiplied by the multiplier 22 by a factor of 5 to produce the first local frequency LO1 that is a frequency on the order of 426 MHz has been added to the other input of the first frequency converter 10, a first intermediate frequency IF1 on the order of 2.8 MHz as the difference between them is obtained at the output of the first frequency converter 10, which is input to the second frequency converter 12. The first local frequency LO1 is then divided by the N1 frequency divider 24 to produce a frequency LO2 which is in turn added as on the order of 2.3 MHz to the second frequency converter 12 to obtain a second intermediate frequency IF2 of 450 kHz as the difference with the first intermediate frequency IF1 on the order of 2.8 MHz. The band-pass filter 14 is subsequently used to select only necessary bands and a demodulator 16 is used to demodulate the received signal for output.

During transmission, an oscillation frequency on the order of 85 MHz of the crystal oscillator 20 is multiplied by the multiplier 22 by a factor of 5 to produce the frequency LO1 on the order of 426 MHz is input to the frequency converter 52 of the lower-side-band cancel mixer 50 and the frequency converter 54 through a +90 degree phase shifter 56. The first local frequency LO1 is divided by the N1 frequency divider 24 to produce a frequency LO2 on the order of 2.3 MHz, which is added to the frequency converter for transmission 34, and the first local frequency LO1 is divided by the N2 frequency divider 26 to produce a third local frequency LO3 on the order of 450 kHz, which is passed through the low-pass filter 28 to reject unnecessary frequency band components such as harmonics components and added to the frequency converter for transmission 34 where the frequencies LO2 and LO3 are added to produce a fourth local frequency LO4 on the same order of 2.8 MHz as the frequency IF1, which is passed through the band-pass filter 30 to reject unnecessary components such as LO2 and others and inputted to the lower-side-band cancel mixer 50.

In the lower-side-band cancel mixer 50, the lower-side-band and LO1 components are suppressed by the first local frequency LO1 and the fourth local frequency LO4 and the upper-side-band components of a frequency on the order of 429 MHz of the sum of both frequencies are combined and amplified by the transmission radio-frequency amplifiers 64, 66. They are subsequently passed from the transmission contact 6c of the transmission-reception selection switch 6 through the common contact 6a to the band-pass filter 4 which rejects the remaining LO1, lower-side-band and other spurious components to be transmitted from the antenna 2.

How to decide, at the designing stage, a first local frequency LO1, a frequency division number N1 of the N1 frequency divider 24, a frequency division number N2 of the N2 frequency divider 26 will now be described.

Suppose that a frequency of the second intermediate frequency IF2 is 450 kHz in relation to a filter, a channel 1 is 429.175MHz, a receiving frequency RF is up to 429.2375 MHz at an interval of 12.5 kHz of six channels. For 429.200 MHz near the center (three channels) of this band, the first local frequency LO1 is first set to a somewhat higher or lower frequency around it so that the difference between them is a first intermediate frequency IF1. In this case suppose that LO1 is a lower 426.4 MHz.

LO1 is then divided by a factor of N1, and find a value for N1 in which a change in frequency when the frequency division number of N1 is varied by 1 as a predetermined number is approximately 12.5 kHz of the channel interval. In this case this condition is met for 185-frequency division, and then determine whether RF-LO1-LO2 is 450 kHz of the second intermediate frequency IF2. Subtract 450 kHz from this result and add the resulting value to 426.4 MHz, the result of which is used to calculate RF-LO1-LO2, repeat this several times, and determine the values of RF3 of the receiving frequency at a channel 3, the first local frequency LO1, the first frequency division number N1, and the second local frequency LO2 as shown in Table 1.

TABLE 1

| RF3 (Hz) | LO1 (Hz) | N1 | LO2 (Hz) | delta f (Hz) | IF2 (Hz) | N2 | LO3 (Hz) | TX (Hz) |
|---|---|---|---|---|---|---|---|---|
| 429,200,000 | 426,444,892 | 170 | 2,508,499 |  | 245,609 | 933 | 457,068 | 429,410,460 |
| 429,200,000 | 426,444,892 | 171 | 2,493,830 | 14,670 | 261,278 | 934 | 456,579 | 429,395,301 |
| 429,200,000 | 426,444,892 | 172 | 2,479,331 | 14,499 | 275,777 | 935 | 456,091 | 429,380,314 |
| 429,200,000 | 426,444,892 | 173 | 2,464,999 | 14,331 | 290,109 | 936 | 455,604 | 429,365,495 |
| 429,200,000 | 426,444,892 | 174 | 2,450,833 | 14,167 | 304,275 | 937 | 455,117 | 429,350,842 |
| 429,200,000 | 426,444,892 | 175 | 2,436,828 | 14,005 | 318,280 | 938 | 454,632 | 429,336,352 |
| 429,200,000 | 426,444,892 | 176 | 2,422,982 | 13,846 | 332,126 | 939 | 454,148 | 429,322,022 |
| 429,200,000 | 426,444,892 | 177 | 2,409,293 | 13,689 | 345,815 | 940 | 453,665 | 429,307,850 |
| 429,200,000 | 426,444,892 | 178 | 2,395,758 | 13,535 | 359,350 | 941 | 453,183 | 429,293,832 |
| 429,200,000 | 426,444,892 | 179 | 2,382,374 | 13,384 | 372,734 | 942 | 452,702 | 429,279,967 |
| 429,200,000 | 426,444,892 | 180 | 2,369,138 | 13,235 | 385,970 | 943 | 452,222 | 429,266,252 |
| 429,200,000 | 426,444,892 | 181 | 2,356,049 | 13,089 | 399,059 | 944 | 451,742 | 429,252,684 |
| 429,200,000 | 426,444,892 | 182 | 2,343,104 | 12,945 | 412,004 | 945 | 451,264 | 429,239,260 |
| 429,200,000 | 426,444,892 | 183 | 2,330,300 | 12,804 | 424,808 | 946 | 450,787 | 429,225,979 |
| 429,200,000 | 426,444,892 | 184 | 2,317,635 | 12,665 | 437,473 | 947 | 450,311 | 429,212,839 |
| 429,200,000 | 426,444,892 | 185 | 2,305,108 | 12,528 | 450,000 | 948 | 449,836 | 429,199,836 |
| 429,200,000 | 426,444,892 | 186 | 2,292,714 | 12,393 | 462,394 | 949 | 449,362 | 429,186,969 |
| 429,200,000 | 426,444,892 | 187 | 2,280,454 | 12,261 | 474,654 | 950 | 448,889 | 429,174,235 |
| 429,200,000 | 426,444,892 | 188 | 2,268,324 | 12,130 | 486,784 | 951 | 448,417 | 429,161,633 |
| 429,200,000 | 426,444,892 | 189 | 2,256,322 | 12,002 | 498,786 | 952 | 447,946 | 429,149,160 |

TABLE 1-continued

| RF3 (Hz) | LO1 (Hz) | N1 | LO2 (Hz) | delta f (Hz) | IF2 (Hz) | N2 | LO3 (Hz) | TX (Hz) |
|---|---|---|---|---|---|---|---|---|
| 429,200,000 | 426,444,892 | 190 | 2,244,447 | 11,875 | 510,661 | 953 | 447,476 | 429,136,815 |
| 429,200,000 | 426,444,892 | 191 | 2,232,696 | 11,751 | 522,412 | 954 | 447,007 | 429,124,595 |
| 429,200,000 | 426,444,892 | 192 | 2,221,067 | 11,629 | 534,041 | 955 | 446,539 | 429,112,498 |
| 429,200,000 | 426,444,892 | 193 | 2,209,559 | 11,508 | 545,549 | 956 | 446,072 | 429,100,523 |
| 429,200,000 | 426,444,892 | 194 | 2,198,170 | 11,389 | 556,938 | 957 | 445,606 | 429,088,667 |
| 429,200,000 | 426,444,892 | 195 | 2,186,897 | 11,273 | 568,211 | 958 | 445,141 | 429,076,930 |
| 429,200,000 | 426,444,892 | 196 | 2,175,739 | 11,158 | 579,369 | 959 | 444,677 | 429,065,308 |
| 429,200,000 | 426,444,892 | 197 | 2,164,695 | 11,044 | 590,413 | 960 | 444,213 | 429,053,800 |

After this, the output of the N1 frequency divider 24 is added to the lower-side-band cancel mixer 50 to provide a transmission frequency 450 kHz lower than the receiving frequency, which is mixed by the frequency converter 34 for transmission 34 with the third local frequency L03 divided by N2 frequency divider 26 by a factor of N2 so as to generate about the same frequency TX as the receiving frequency. By finding a frequency division number N2 for this purpose, it is possible to obtain an N2 in Table 1, and furthermore, a third local frequency L03 and a transmission frequency TX.

Although this results depend on the intended frequency channel and channel interval, both a delta RX for reception and a delta TX for transmission may be included within an acceptable range by repeatedly performing the procedures as above. For this purpose, it is necessary to switch the N1 and N2 with switching of the channels. This is addressed by switching control of a control circuit, not shown, that reads out a frequency division number from the pre-stored Table with channel switching.

Although this embodiment uses the lower-side-band cancel mixer 50 that suppresses lower-side-band and L01 com-

TABLE 2

| RF (Hz) | LO1 (Hz) | N1 | LO2 (Hz) | IF2 (Hz) | delta RX (Hz) | N2 | LO3 (Hz) | TX (Hz) | delta TX (Hz) |
|---|---|---|---|---|---|---|---|---|---|
| 429,175,000 | 426,444,892 | 187 | 2,280,454 | 449,654 | −346 | 948 | 449,836 | 429,175,182 | 182 |
| 429,187,500 | 426,444,892 | 186 | 2,292,714 | 449,894 | −106 | 948 | 449,836 | 429,187,443 | −57 |
| 429,200,000 | 426,444,892 | 185 | 2,305,108 | 450,000 | 0 | 948 | 449,836 | 429,199,836 | −164 |
| 429,212,500 | 426,444,892 | 184 | 2,317,635 | 449,973 | −27 | 948 | 449,836 | 429,212,364 | −136 |
| 429,225,000 | 426,444,892 | 183 | 2,330,300 | 449,808 | −192 | 948 | 449,836 | 429,225,028 | 28 |
| 429,237,500 | 426,444,892 | 182 | 2,343,104 | 449,504 | −496 | 948 | 449,836 | 429,237,832 | 332 |

From the result of Table 1, RF, L01, N1, L02, IF2, N2, L03, and TX corresponding to the transmission-reception of six channels in Table 2 are obtained. However, the delta RX of the differential frequency with the original receiving channel during reception is −496 Hz at six channels, which is somewhat large, and also the delta TX of the differential frequency with the original transmitting channel during transmission is 332 Hz at six channels, which is somewhat large. So L01 is modified so that the delta RX on the channel 6 may be somewhat lower with respect to the values in Table 2 and the delta RX may be lower over all the channels to avoid degradation on the channel 1, and the frequency division number N2 is reduced by 1 on the channels 2–5 to 947 frequency division for transmission frequency to lower the delta TX. This adjustment is shown in Table 3.

ponents to output an upper side band, it is not limited to this, a simple frequency converter may be used if it is not necessary to produce a single-side-band output. This is the case with the following embodiments below.

Although this embodiment has a frequency as a channel interval that varies by changing the first frequency division number N1 by one, it may have a frequency as a channel interval that varies by changing the first frequency division number by two or more.

Although the use of a crystal oscillator as an oscillation means is described in this embodiment of this invention, a PLL synthesizer may be used instead of a crystal oscillator. In this case, channel switching may be completed in a short time by fixing the output frequency of the PLL synthesizer during channel switching and performing the channel

TABLE 3

| RF (Hz) | LO1 (Hz) | N1 | LO2 (Hz) | IF2 (Hz) | delta RX (Hz) | N2 | LO3 (Hz) | TX (Hz) | delta TX (Hz) |
|---|---|---|---|---|---|---|---|---|---|
| 429,175,000 | 426,444,650 | 187 | 2,280,453 | 449,897 | −103 | 948 | 449,836 | 429,174,939 | −61 |
| 429,187,500 | 426,444,650 | 186 | 2,292,713 | 450,137 | 137 | 947 | 450,311 | 429,187,674 | 174 |
| 429,200,000 | 426,444,650 | 185 | 2,305,106 | 450,244 | 244 | 947 | 450,311 | 429,200,067 | 67 |
| 429,212,500 | 426,444,650 | 184 | 2,317,634 | 450,216 | 216 | 947 | 450,311 | 429,212,595 | 95 |
| 429,225,000 | 426,444,650 | 183 | 2,330,299 | 450,051 | 51 | 947 | 450,311 | 429,225,260 | 260 |
| 429,237,500 | 426,444,650 | 182 | 2,343,102 | 449,748 | −252 | 948 | 449,836 | 429,237,589 | 89 | switching by varying the frequency of the frequency divider. The advantage of using a PLL synthesizer is that the number of channels for reception can be increased.

Although this embodiment is described for a transmitter-receiver, a transmission-reception selection switch 6, an N2 frequency divider 26, a low-pass filter 28, a frequency converter for transmission 34, a band-pass filter 30, a lower-side-band cancel mixer 50, a transmission radio-frequency amplifiers 64,66 are unnecessary for reception only, and the frequency division number of the N1 frequency divider 24 may be N.

With the above configuration and operation this embodiment provides a receiver and transmitter-receiver that achieves boot-up operation during powering and frequency switching in a short time and has lowered power source consumption.

(Embodiment 2)

In FIG. 1 of the first embodiment described above where a signal of a frequency as high as 426 MHz is divided, the amount of current consumed of the N1 and N2 frequency dividers may be large. Therefore, review the configuration in which a lower frequency is divided before the output of the crystal oscillator is multiplied.

in FIG. 1 of the first embodiment, detailed description is omitted with the same references as in the FIG. 1.

If a digital value is provided from a control circuit, not shown, to the digital/analog converter 72, it is converted to an analog value which is added to the variable-capacitance diode 70. By making this capacitance variable, the capacitance equivalently added to the crystal resonator of the crystal oscillator 20 may be varied to permit fine-tuning of oscillation frequency. The digital/analog converter 72 on the order of 3 bits permits fine-tuning on the order of ±0.5 ppm.

Frequency division numbers N1, N2 or oscillation frequency of the crystal oscillator 20 may be determined in the same manner as in the first embodiment. However, in such a configuration, a frequency, not yet multiplied, is low, and the frequency division numbers of the N1 and N2 frequency dividers 24 and 26 are lower than that of the first embodiment, so that six channels may not be satisfied. By making a voltage applied to the variable-capacitance diode 70 variable, a desired frequency of the crystal oscillator 20 may then be obtained for each of the channels.

TABLE 4

Correction with D/A

<RX>

| ch | RF | LO1 (RX) | Xtal (RX) | delta LO1 (RX) | N1 | LO2 (RX) | IF2 | delta RX | |
|---|---|---|---|---|---|---|---|---|---|
| 1 | 429,175,000 | 427,718,603 | 85,543,721 | 399 | 85 | 1,006,397 | 450,000 | 0 | |
| 2 | 429,187,500 | 427,719,121 | 85,543,824 | 917 | 84 | 1,018,379 | 450,000 | 0 | |
| 3 | 429,200,000 | 427,719,351 | 85,543,870 | 1,147 | 83 | 1,030,649 | 450,000 | 0 | |
| 4 | 429,212,500 | 427,719,282 | 85,543,856 | 1,078 | 82 | 1,043,218 | 450,000 | 0 | |
| 5 | 429,225,000 | 427,718,904 | 85,543,781 | 700 | 81 | 1,056,096 | 450,000 | 0 | |
| 6 | 429,237,500 | 427,718,204 | 85,543,641 | 0 | 80 | 1,069,296 | 450,000 | 0 | LO10 (RX) = 427,718,204 |

<TX>

| ch | RF | LO1 (TX) | Xtal (TX) | delta LO1 (TX) | N1 | LO3 | N2 | LO3 | TX | delta TX |
|---|---|---|---|---|---|---|---|---|---|---|
| 1 | 429,175,000 | 427,718,374 | 85,543,675 | 170 | 85 | 1,006,396 | 190 | 450,230 | 429,175,000 | 0 |
| 2 | 429,187,500 | 427,718,891 | 85,543,778 | 687 | 84 | 1,018,378 | 190 | 450,230 | 429,187,500 | 0 |
| 3 | 429,200,000 | 427,719,121 | 85,543,824 | 917 | 83 | 1,030,648 | 190 | 450,231 | 429,200,000 | 0 |
| 4 | 429,212,500 | 427,719,052 | 85,543,810 | 848 | 82 | 1,043,217 | 190 | 450,231 | 429,212,500 | 0 |
| 5 | 429,225,000 | 427,718,674 | 85,543,735 | 470 | 81 | 1,056,095 | 190 | 450,230 | 429,225,000 | 0 |
| 6 | 429,237,500 | 427,717,976 | 85,543,595 | −228 | 80 | 1,069,295 | 190 | 450,229 | 429,237,500 | 0 |

Figure 2:
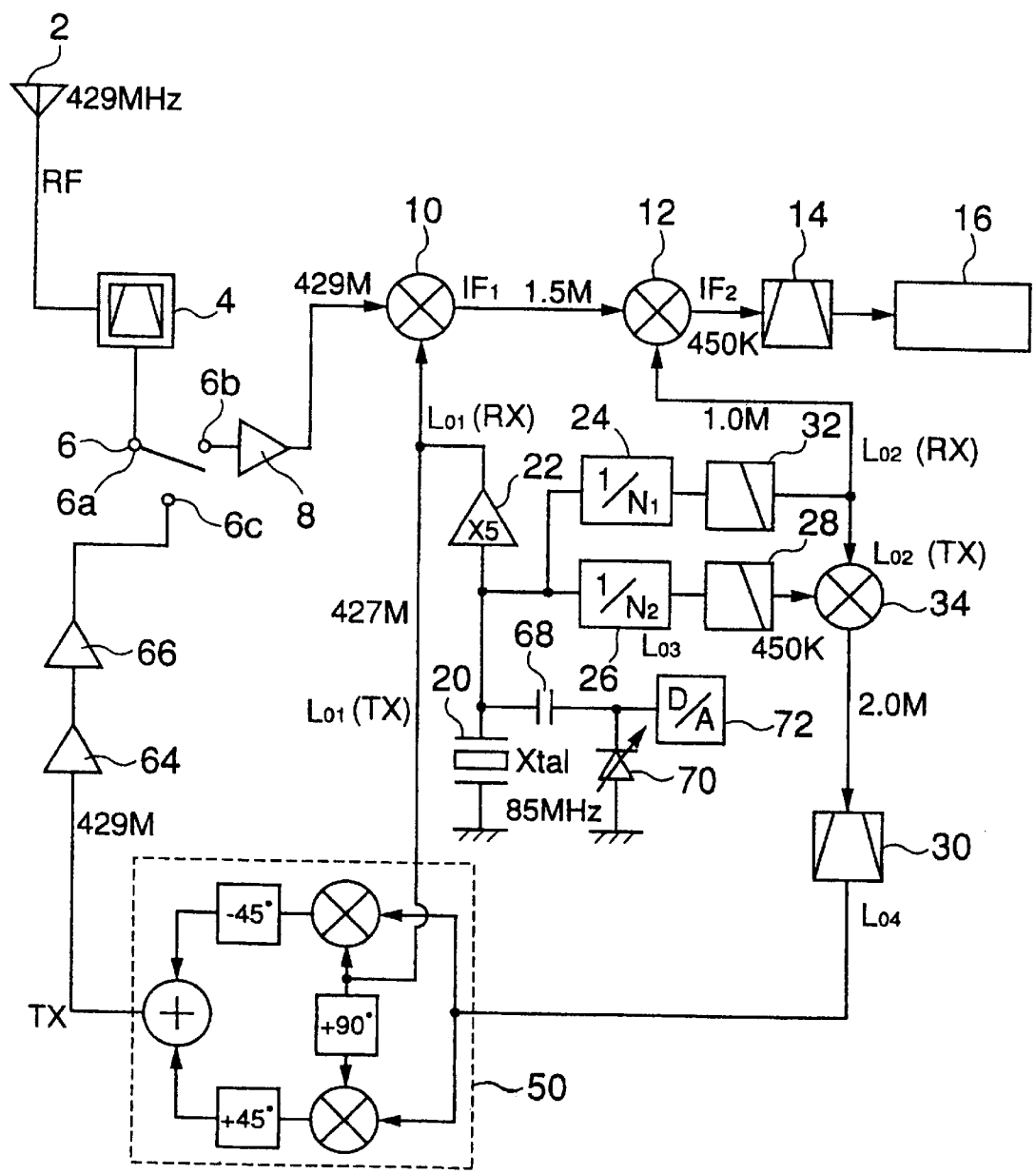
FIG. 2 is a block diagram showing a transmitter-receiver of a second embodiment according to this invention.

FIG. 2 is a block diagram of a transmitter-receiver of a second embodiment according to this invention. A channel number, a frequency, and an inter-channel frequency interval for transmitter-receiver will be described being same as with the first embodiment. FIG. 2 differs from FIG. 1 in that the output of a crystal oscillator 20 with a fundamental oscillation frequency on the order of 85 MHz is input to an N1 frequency divider 24 and N2 frequency divider 26 before being input to a multiplier 22 for multiplication by a factor of 5, a low-pass filter 32 is inserted after the N1 frequency divider 24 for cut off harmonics, and a variable-capacitance diode 70 that varies in capacitance according to an applied voltage is coupled to the crystal oscillator 20 through a small capacitance capacitor 68, a digital/analog converter 72 is coupled as a bias circuit to the variable-capacitance diode 70 to form a frequency fine-tuning means. Also, unlike the first embodiment, the oscillation means in this case is only defined as a crystal oscillator 20, and the multiplier 22 as a multiplication means. Since the other parts are the same as Table 4 lists the respective frequencies of the parts of the circuit during transmission and reception in the circuit configuration in FIG. 2. The frequency division numbers N1, N2 and the oscillation frequency Xtal of the crystal oscillator 20 are varied by delta L01 to finely tune them accurately to the receiving frequency RF and the transmitting frequency TX. The low-pass filter 32 is necessary to reject harmonics because the output frequencies of the N1 frequency divider 24 and the N2 frequency divider 26 get close.

Although this embodiment is described for a transmitter-receiver, a transmission-reception selection switch 6, an N2 frequency divider 26, a low-pass filter 28, a frequency converter for transmission 34, a band-pass filter 30, a lower-side-band cancel mixer 50, a transmission radio-frequency amplifiers 64,66 in FIG. 2 are unnecessary for reception only, and the frequency division number of the N1 frequency divider 24 may be N.

Thus, the second embodiment offers the advantage that in addition to the advantage of the first embodiment, the configuration in which the first and second frequency dividers are coupled to a lower portion of the frequency before the output of the crystal oscillator is multiplied lowers power consumption of the first and second frequency dividers and gives longer service life of a battery, if used.

IF2. This is solved by using a different frequency division number N of the N1 frequency divider 24 for reception than that for transmission.

TABLE 5

| RF3 (Hz) | LO1 (Hz) | IF1 (Hz) | skip number | N (frequency division) | LO2 (Hz) | IF2 (Hz) | ch sep. (Hz) | Frequency difference of IF2 | | |
|---|---|---|---|---|---|---|---|---|---|---|
| 429,200,000 | 426,000,000 | 3,200,000 | 1 | 183 | 2,327,869 | 872,131 | | | | |
| 429,200,000 | 426,000,000 | 3,200,000 | 1 | 184 | 2,315,217 | 884,783 | 12,651 | | | |
| 429,200,000 | 426,000,000 | 3,200,000 | 1 | 185 | 2,302,703 | 897,297 | 12,515 | | | |
| 429,200,000 | 426,000,000 | 3,200,000 | 1 | 186 | 2,290,323 | 909,677 | 12,380 | | | |
| 429,200,000 | 426,000,000 | 3,200,000 | 1 | 187 | 2,278,075 | 921,925 | 12,248 | 677k | | |
| 429,200,000 | 426,000,000 | 3,200,000 | 2 | 258 | 1,651,163 | 1,548,837 | | | | |
| 429,200,000 | 426,000,000 | 3,200,000 | 2 | 260 | 1,638,462 | 1,561,538 | 12,701 | | | |
| 429,200,000 | 426,000,000 | 3,200,000 | 2 | 262 | 1,625,954 | 1,574,046 | 12,507 | | | |
| 429,200,000 | 426,000,000 | 3,200,000 | 2 | 264 | 1,613,636 | 1,586,364 | 12,318 | | | |
| 429,200,000 | 426,000,000 | 3,200,000 | 2 | 266 | 1,601,504 | 1,598,496 | 12,133 | 298k | | |
| 429,200,000 | 426,000,000 | 3,200,000 | 3 | 315 | 1,352,381 | 1,847,619 | | | | |
| 429,200,000 | 426,000,000 | 3,200,000 | 3 | 318 | 1,339,623 | 1,860,377 | 12,758 | | | |
| 429,200,000 | 426,000,000 | 3,200,000 | 3 | 321 | 1,327,103 | 1,872,897 | 12,520 | | 480k | |
| 429,200,000 | 426,000,000 | 3,200,000 | 3 | 324 | 1,314,815 | 1,885,185 | 12,288 | | | |
| 429,200,000 | 426,000,000 | 3,200,000 | 3 | 327 | 1,302,752 | 1,897,248 | 12,063 | | | |
| 429,200,000 | 426,000,000 | 3,200,000 | 4 | 360 | 1,183,333 | 2,016,667 | | 182k | | 600k |
| 429,200,000 | 426,000,000 | 3,200,000 | 4 | 364 | 1,170,330 | 2,029,670 | 13,004 | | | |
| 429,200,000 | 426,000,000 | 3,200,000 | 4 | 368 | 1,157,609 | 2,042,391 | 12,721 | | | |
| 429,200,000 | 426,000,000 | 3,200,000 | 4 | 372 | 1,145,161 | 2,054,839 | 12,447 | | | |
| 429,200,000 | 426,000,000 | 3,200,000 | 4 | 376 | 1,132,979 | 2,067,021 | 12,183 | | | |
| 429,200,000 | 426,000,000 | 3,200,000 | 5 | 400 | 1,065,000 | 2,135,000 | | 119k | | |
| 429,200,000 | 426,000,000 | 3,200,000 | 5 | 405 | 1,051,852 | 2,148,148 | 13,148 | | | |
| 429,200,000 | 426,000,000 | 3,200,000 | 5 | 410 | 1,039,024 | 2,160,976 | 12,827 | | | |
| 429,200,000 | 426,000,000 | 3,200,000 | 5 | 415 | 1,026,506 | 2,173,494 | 12,518 | | | |
| 429,200,000 | 426,000,000 | 3,200,000 | 5 | 420 | 1,014,286 | 2,185,714 | 12,220 | | | |
| 429,200,000 | 426,000,000 | 3,200,000 | 6 | 440 | 968,182 | 2,231,818 | | 84k | | |
| 429,200,000 | 426,000,000 | 3,200,000 | 6 | 446 | 955,157 | 2,244,843 | 13,025 | | | |
| 429,200,000 | 426,000,000 | 3,200,000 | 6 | 452 | 942,478 | 2,257,522 | 12,679 | | | |
| 429,200,000 | 426,000,000 | 3,200,000 | 6 | 458 | 930,131 | 2,269,869 | 12,347 | | | |
| 429,200,000 | 426,000,000 | 3,200,000 | 6 | 464 | 918,103 | 2,281,897 | 12,028 | | | |

(Embodiment 3)

There must be a low-pass filter of about 450 kHz at the output of the N2 frequency divider in the first embodiment described above, and at the outputs of the N1 and the N2 frequency dividers in the second embodiment, respectively. This filter is disadvantageously large in shape for its low frequency and difficult to incorporate into an integrated circuit. This embodiment proposes a configuration that eliminates the need of this filter to provide a simple circuit.

Figure 3:
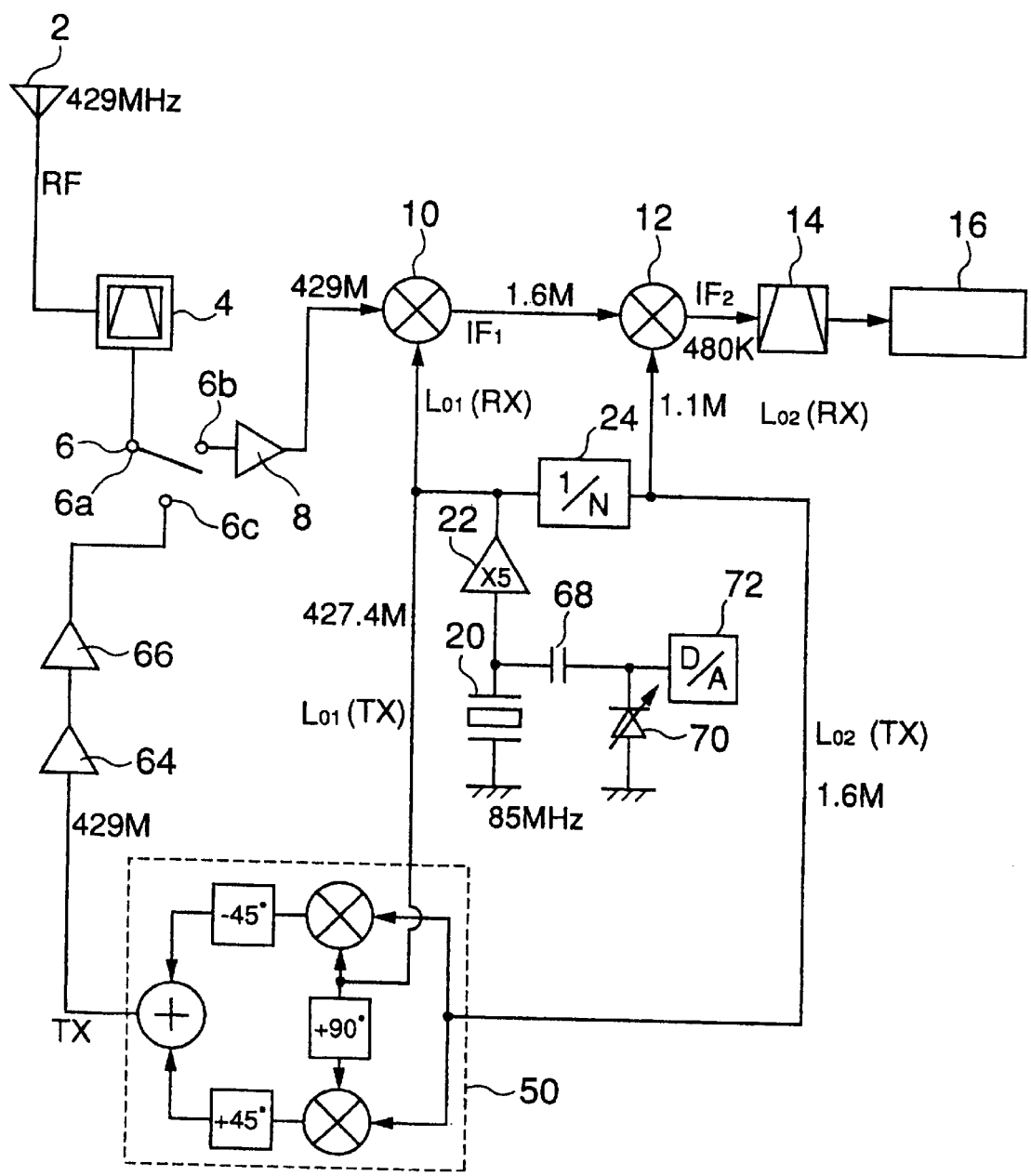
FIG. 3 is a block diagram showing a transmitter-receiver of a third embodiment according to this invention.

FIG. 3 is a block diagram of a transmitter-receiver of a third embodiment according to this invention. Transmitting and receiving channels, frequency, and frequency interval are the same as in the above embodiments, with 429.175 MHz as the channel 1, six channels of frequencies at an interval of 12.5 kHz for reception and transmission.

FIG. 3 differs from FIG. 2 of the second embodiment in that the N1 frequency divider 24 is coupled to the output of the multiplier 22 by a factor of 5, the output of the N1 frequency divider 24 is coupled to the second frequency converter 12 and the lower-side-band cancel mixer 50, and the N2 frequency divider 26, the low-pass filters 28, 32, and the frequency converter for transmission 34 in FIG. 2 are omitted. Since the other parts are the same as in FIG. 2 of the second embodiment, detailed description is omitted with the same references as in the FIG. 2.

As described so far, a frequency L02 (TX) to be provided to the lower-side-band cancel mixer 50 must be higher than a frequency L02 (RX) to be provided to the second frequency converter 12 by the second intermediate frequency Table 5 lists the calculation of frequency division number N to obtain a frequency interval of 12.5 kHz or so when skipping the frequency division number N on a basis of one, two or six with L01 at 426 MHz centered on 429.2 MHz of the 3 channels, as in the above embodiments. The larger the skipping number is, the lower the divided output frequency L02 is. As described above, on the basis of Table 5, it can be seen between the group of the skipping number that the difference of the output frequency L02 between the group of skipping the frequency division number N on a basis of four and the group of skipping on a basis of two is about 480 kHz, and the difference between the group of skipping the frequency division number N on a basis of five and the group of skipping on a basis of two is about 600 kHz.

The group for skipping the frequency division number N by four or five may be used for a frequency for reception and the group for skipping the frequency division number N on a basis of two for a frequency for transmission to produce a 480 kHz or 600 kHz higher frequency for transmission which may be used as an intermediate frequency. Then the numeric value in Table 5 to the second intermediate frequency IF2 is too high as it is, the center frequency of the crystal oscillator 20 is varied so that the value of RF-L01-L02 may be modified to 480 kHz or 600 kHz as the second intermediate frequency IF2. The deviation to the original frequency for each channel may be finely tuned by applying the output of the D/A converter to the variable-capacitance diode, as in the second embodiment.

A ceramic filter, which is normally 450 kHz, may be modified for use at a 480 kHz, and must be newly developed for 600 kHz, although the shape may be advantageously reduced by about 30% due to its high frequency.

From Table 5, a method of determining a frequency division number N of the N1 frequency divider 24 and an output frequency of the multiplier 22 of the oscillation means is first to determine a number to skip a frequency division number N of the N1 frequency divider 24 to a first predetermined number, 2 in this example, during transmission, and to determine the frequency division number N of the N1 frequency divider 24 and the frequency of the output signal of the multiplier 22 that is L01 so that a change in frequency of the output signal of the frequency division means due to a change by the first predetermined number is the same as the transmitting channel interval and this frequency division number causes radio-frequency signal TX for transmission to be at a predetermined frequency, and further to determine what frequency division number N of the N1 frequency divider 24 to be skipped to a second predetermined number, 5 in this example, during reception, and to determine the frequency division number N of the N1 frequency divider 24 so that a change in frequency of the output signal of the N1 frequency divider 24 due to a change in the second predetermined number is the same as the receiving channel interval. Thus, the frequency division number may be determined so as to differ from during transmission to during reception.

Thus, in the third embodiment, in addition to the advantage of the first embodiment, there is another advantage that it uses a single frequency division, requires no frequency converter for transmission or large-volume filter, and it is suitable for use in an integrated circuit.

(Embodiment 4)

Although the third embodiment described above has a merit that it uses a single frequency division and requires no large filter, the high frequency variable frequency divider consumes a large amount of current. Therefore, there is proposed a means to solve this by developing the third embodiment.

Figure 4:
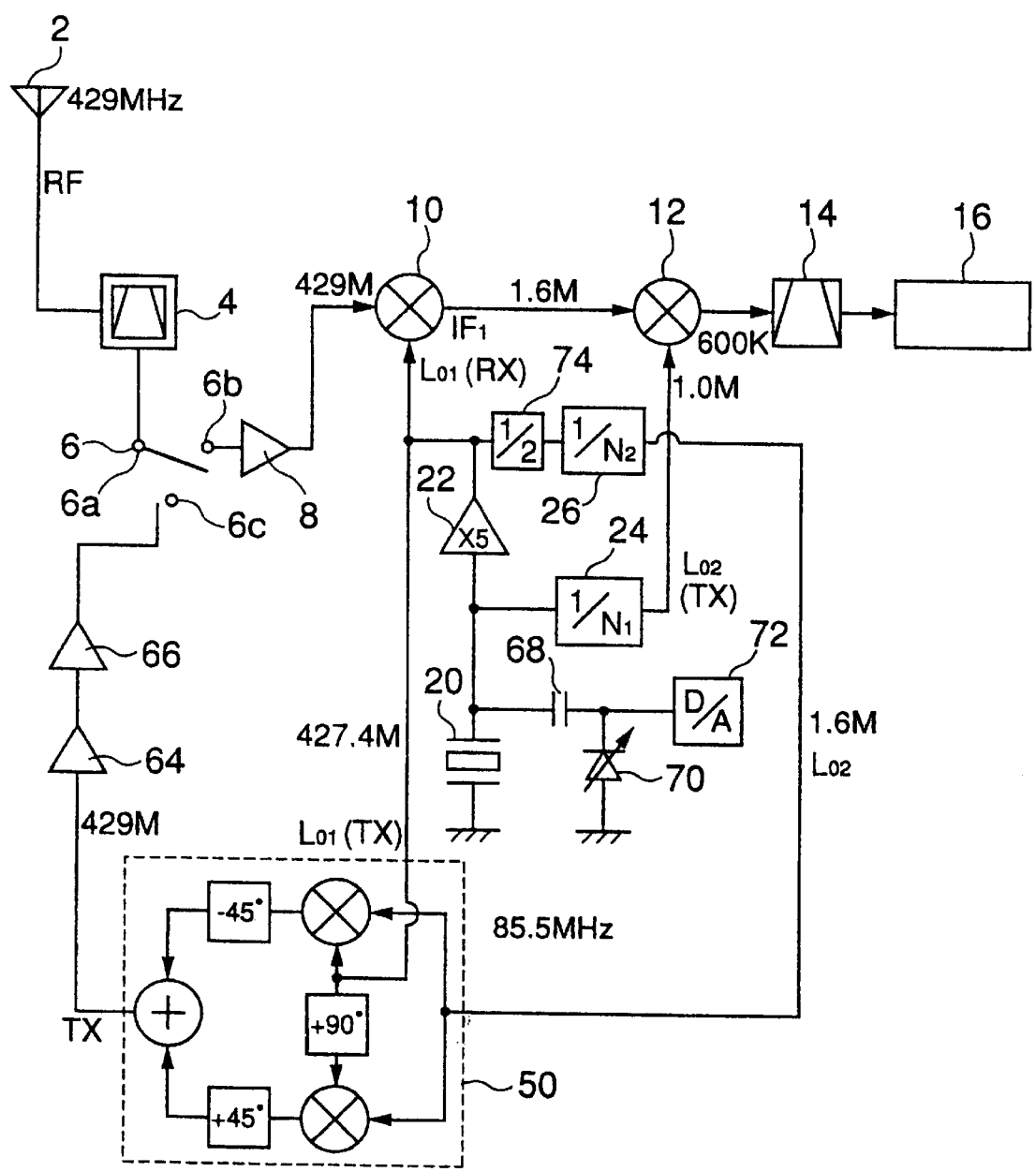
FIG. 4 is a block diagram showing a transmitter-receiver of a fourth embodiment according to this invention.
Figure 5:
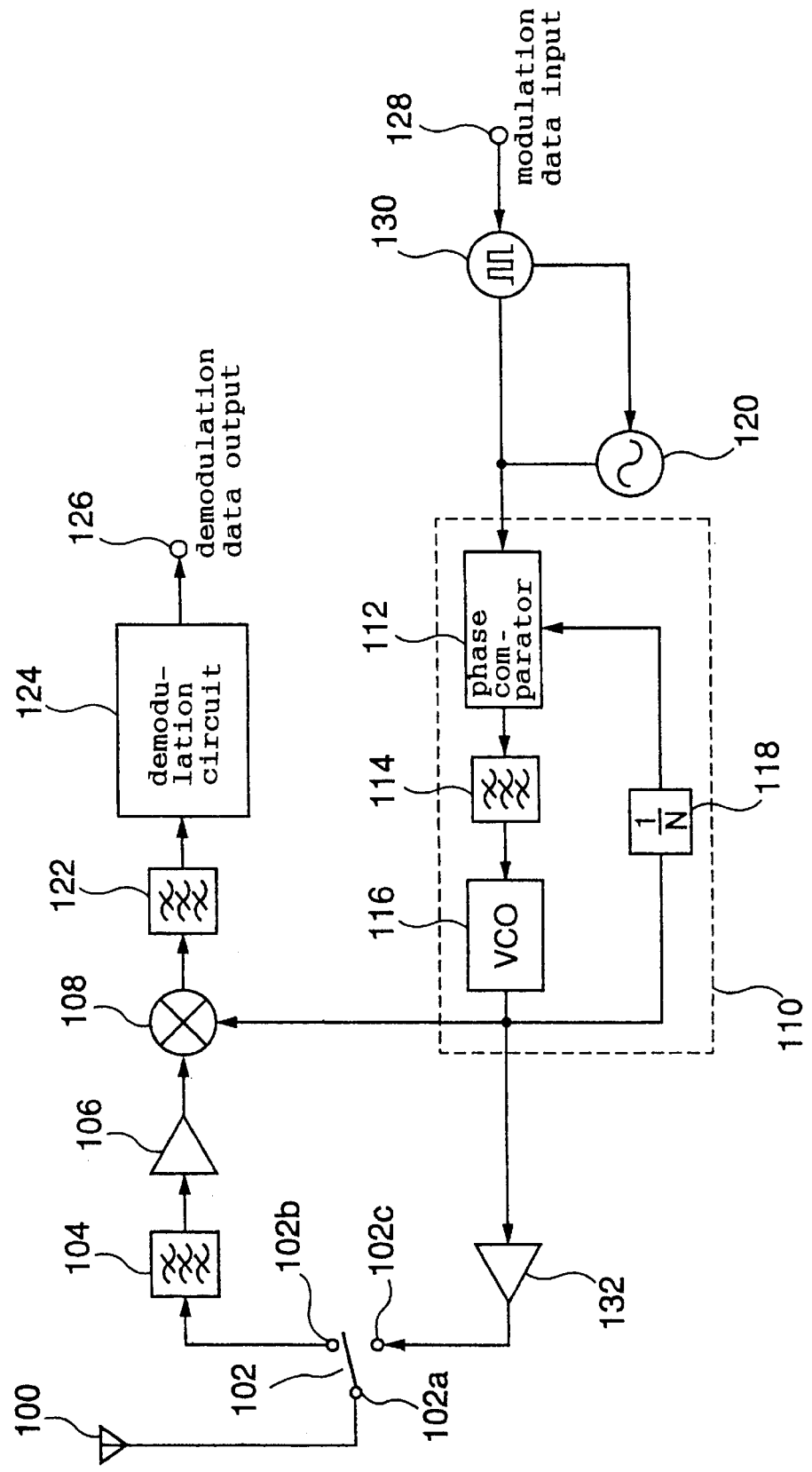
FIG. 5 is a block diagram of a conventional transmitter-receiver.

FIG. 4 is a block diagram of a transmitter-receiver of a fourth embodiment according to this invention. FIG. 4 differs from FIG. 3 in that the N1 frequency divider 24 is coupled between the crystal oscillator 20 and the multiplier 22 for multiplication by a factor of 5, the output of the multiplier 22 is input through a 1/2 prescaler 74 that is a fixed frequency division means to the N2 frequency divider 26, the output of the N1 frequency divider 24 is input to the second frequency converter 12, and the output of the N2 frequency divider 26 is input to the lower-side-band cancel mixer 50. Since the other parts are the same as in FIG. 3 of the third embodiment, detailed description is omitted with the same references as in the FIG. 3.

The idea used in the third embodiment of skipping transmission frequency on a basis of frequency division number 2 is identical to that of switching the frequency division number of the N2 frequency divider 26 on a basis of one by including a 1/2 prescaler 74 that is a fixed frequency divider, instead of skipping on a basis of two in the absence of the 1/2 prescaler 74. Switching the frequency division number on a basis of one without passing through the multiplier 22 that multiplies the N1 frequency divider 24 by a factor of 5 is identical to switching the frequency division number on a basis of five.

TABLE 6(a)

| | | | | | TX | | | |
|---|---|---|---|---|---|---|---|---|
| ch | RF (Hz) | X'tal osc. | LO1 (Hz) | pre. N | N2 (TX) | LO2 (TX) (Hz) | LO3 (TX) (Hz) | ch sepa. | delta RF (TX) |
| 6 | 429,237,500 | 85,513,613 | 427,568,065 | 2 | 128 | 1,670,188 | 429,238,253 |  | 753 |
| 5 | 429,225,000 | 85,513,613 | 427,568,065 | 2 | 129 | 1,657,241 | 429,225,306 | 12,947 | 306 |
| 4 | 429,212,500 | 85,513,613 | 427,568,065 | 2 | 130 | 1,644,493 | 429,212,558 | 12,748 | 58 |
| 3 | 429,200,000 | 85,513,613 | 427,568,065 | 2 | 131 | 1,631,939 | 429,200,004 | 12,553 | 4 |
| 2 | 429,187,500 | 85,513,613 | 427,568,065 | 2 | 132 | 1,619,576 | 429,187,641 | 12,363 | 141 |
| 1 | 429,175,000 | 85,513,613 | 427,568,065 | 2 | 133 | 1,607,399 | 429,175,464 | 12,177 | 464 |

TABLE 6(b)

| | | | | | RX | | | |
|---|---|---|---|---|---|---|---|---|
| ch | RF (Hz) | X'tal osc. | LO1 (Hz) | pre. N | N1 (RX) | LO2 (RX) (Hz) | LO3 (RX) (Hz) | ch sepa. | delta RF (RX) |
| 6 | 429,237,500 | 85,513,613 | 427,568,065 | 5 | 80 | 1,068,920 | 600,515 |  | −1,136 |
| 5 | 429,225,000 | 85,513,613 | 427,568,065 | 5 | 81 | 1,055,724 | 601,211 | 13,197 | −439 |
| 4 | 429,212,500 | 85,513,613 | 427,568,065 | 5 | 82 | 1,042,849 | 601,586 | 12,875 | −64 |
| 3 | 429,200,000 | 85,513,613 | 427,568,065 | 5 | 83 | 1,030,284 | 601,651 | 12,564 | 0 |
| 2 | 429,187,500 | 85,513,613 | 427,568,065 | 5 | 84 | 1,018,019 | 601,416 | 12,265 | −235 |
| 1 | 429,175,000 | 85,513,613 | 427,568,065 | 5 | 85 | 1,006,043 | 600,892 | 11,977 | −758 |

Table 6a lists the frequencies of the parts of the prescaler 74 for frequency division number 2. The deviation of delta RF (TX) may be corrected by varying the capacity of the variable-capacitance diode 70 by an analog voltage from the D/A converter 72 to vary the oscillation frequency of the crystal oscillator 20.

Table 6b shows the relationship between the frequencies of the parts when the intermediate frequency IF2 is operated at 600 kHz by varying the frequency division number N1 of the N1 frequency divider 24 on a basis of 1 during reception, wherein the N1 frequency divider 24 is coupled to the position shown in FIG. 4 to achieve substantially the same operation as the insertion of 1/5 prescaler.

From Tables 6a and 6b, a method of determining a frequency division number N1 of the N1 frequency divider 24, a frequency division number N2 of the N2 frequency divider 26, and a frequency of the crystal oscillator 20 is to first, for transmission, determine the frequency division number N2 of the N2 frequency divider 26 and a frequency of the output signal of the crystal oscillator 20 so that a change in frequency of the output signal equivalent to the frequency division number N2 of the N2 frequency divider 26 that is a second variable frequency division means that is varied on a basis of 1, that is, the second predetermined number on a basis of 2 in the absence of the prescaler 74 is the same as the transmitting channel interval and this frequency division number causes radio-frequency signal TX for transmission to be at a predetermined frequency. The next step, for reception, is to determine the frequency division number N1 so that a change in frequency of the output signal by varying the frequency division number N1 of the N1 frequency divider 24 that is a first variable frequency division means on a basis of 1, that is, by varying the first determined number on a basis of 5 after multiplication by a factor of 5 before a multiplier 22 for multiplying by a factor of 5 is the same as the transmitting channel interval, and to determine the frequency division numbers of the N1 and N2 frequency dividers 24, 26 so that they may have different values during transmission and during reception.

Thus, although, in this embodiment, the number of frequency dividers and prescalers is increased compared with the third embodiment, it provides a configuration that reduces an overall amount of current consumed by using a prescaler 74 due to the smaller circuit size of the prescaler compared with direct input to the N2 frequency divider 26, and as in the third embodiment, in addition to the advantage of the first embodiment, requires no frequency converter for transmission or large-volume low-frequency filter, reduces an amount of current consumed, and has lower volume and is suitable for use in an integrated circuit.

The values of frequency, channel interval, multiplication number, and frequency division number, and a method of frequency fine-tuning in the above embodiments have been illustrated by way of example and not by way of limitation.

Also, those used in one embodiment may be used in combination with those used in another embodiment. For example, the frequency fine-tuning means of the first embodiment may be replaced with that of the second embodiment, or the frequency fine-tuning means may be removed from the second embodiment.

In addition, although a transmitting channel and a receiving channel have been described as common in the above embodiment, it goes without saying that a different transmitting channel from a receiving channel may be easily used by shifting transmission frequency.

As described above, this invention, according to the receiver in the configuration of claim 1, has an advantage that it achieves boot-up operation during powering and frequency switching in a short time and gives longer life of a battery, if used.

Also, this invention, according to the receiver in the configuration of claim 2, in addition to the advantage of the configuration of claim 1, has an advantage that it lowers power consumption of a frequency divider and gives longer service life of a battery, if used.

Also, this invention, according to the receiver in the configuration of claims 3 to 5, has an advantage that it permits easy fine-tuning of a receiving frequency in the configuration of claim 1 or 2 to a specified receiving channel frequency.

Also, this invention, according to the transmitter-receiver in the configuration of claim 6, has an advantage that it achieves boot-up operation during powering and frequency switching in a short time and gives longer life of a battery, if used.

Also, this invention, according to the transmitter-receiver in the configuration of claim 7, in addition to the advantage of the configuration of claim 6, has an advantage that it lowers power consumption of a first and second frequency dividers and gives longer service life of a battery, if used.

Also, this invention, according to the transmitter-receiver in the configuration of claim 8, in addition to the advantage of the configuration of claim 6, has an advantage that it uses a single frequency divider, requires no frequency converter for transmission or large-sized filter, and it is suitable for use in an integrated circuit.

Also, this invention, according to the transmitter-receiver in the configuration of claim 9, in addition to the advantage of the configuration of claim 6, has an advantage that it provides a configuration that requires no frequency converter for transmission or large-volume low-frequency filter, reduces an amount of current consumed, has low volume and is suitable for use in an integrated circuit.

Also, this invention, according to the transmitter-receiver configuration in the configuration of claims 10 to 12, has an advantage that it permits easy fine-tuning of a receiving or transmitting frequency in the configuration of claims 6 to 9 to a specified channel frequency.

What is claimed is:

1. A transmitter-receiver that performs transmission and reception by selecting any of a plurality of equally set channels, comprising:

an oscillation means for oscillating a signal at a certain frequency;

a first frequency conversion means for getting a received radio-frequency signal an output signal of said oscillation means to convert the received radio-frequency signal to a first intermediate frequency signal;

a first frequency division means for dividing the signal frequency of said oscillation means by a factor of N1;

a second frequency division means for dividing the signal frequency of said oscillation means by a factor of N2;

a second frequency conversion means for getting said first intermediate frequency signal and the output signal of said first frequency division means to output a second intermediate frequency signal;

a demodulation means for demodulating said second intermediate frequency signal;

a first frequency conversion means for transmission for getting the output signal of said first frequency division means and the output signal of said second frequency division means to output intermediate frequency signal for transmission; and a second frequency conversion means for transmission for getting the output signal of said oscillation means and the output signal of said first frequency conversion means for transmission to output a radio-frequency signal for transmission;

wherein the frequency division number N1 of said first frequency division means and the frequency of the output signal of said oscillation means are predetermined so that a change in frequency of the output signal of said first frequency division means due to a change in said frequency division number N1 by a predetermined number is the same as said channel interval and this frequency division number causes said second intermediate frequency signal to be at a predetermined frequency, and wherein the frequency division number N2 of said second frequency division means is predetermined so that said radio-frequency signal for transmission is at a predetermined frequency.

2. A transmitter-receiver according to claim 1 wherein a crystal oscillator is used as an oscillation means.

3. A transmitter-receiver according to claim 1 further comprising a frequency fine-tuning means for fine-tuning of an oscillation frequency of the oscillation means.

4. A transmitter-receiver according to claim 3 wherein the frequency fine-tuning means has a variable-capacitance semiconductor device and performs fine-tuning of oscillation frequency by applying a digital signal converted to an analog signal.

5. A transmitter-receiver that performs transmission and reception by selecting any of a plurality of equally set channels, comprising:
   an oscillation means for oscillating a signal at a certain frequency;
   a multiplication means for multiplying the output signal of the oscillation means by a factor of a predetermined multiplication number;
   a first frequency conversion means for getting a received radio-frequency signal an output signal of said multiplication means to convert the received radio-frequency signal to a first intermediate frequency signal;
   a first frequency division means for dividing the signal frequency of said oscillation means by a factor of N1;
   a second frequency division means for dividing the signal frequency of said oscillation means by a factor of N2;
   a second frequency conversion means for getting said first intermediate frequency signal and the output signal of said first frequency division means to output a second intermediate frequency signal;
   a demodulation means for demodulating said second intermediate frequency signal;
   a first frequency conversion means for transmission for getting the output signal of said first frequency division means and the output signal of said second frequency division means to output intermediate frequency signal for transmission; and
   a second frequency conversion means for transmission for getting the output signal of said multiplication means and the output signal of said first frequency conversion means for transmission to output a radio-frequency signal for transmission;
   wherein the frequency division number N1 of said first frequency division means and the frequency of the output signal of said oscillation means are predetermined so that a change in frequency of the output signal of said first frequency division means due to a change in said frequency division number N1 by a predetermined number is the same as said channel interval and this frequency division number causes said second intermediate frequency signal to be at a predetermined frequency, and wherein the frequency division number N2 of said second frequency division means is predetermined so that said radio-frequency signal for transmission is at a predetermined frequency.

6. A transmitter-receiver according to claim 5 wherein a crystal oscillator is used as an oscillation means.

7. A transmitter-receiver according to claim 5 further comprising a frequency fine-tuning means for fine-tuning of an oscillation frequency of the oscillation means.

8. A transmitter-receiver according to claim 7 wherein the frequency fine-tuning means has a variable-capacitance semiconductor device and performs fine-tuning of oscillation frequency by applying a digital signal converted to an analog signal.

9. A transmitter-receiver that performs transmission and reception by selecting any of a plurality of equally set channels, comprising:
   an oscillation means for oscillating a signal at a certain frequency;
   a first frequency conversion means for getting a received radio-frequency signal an output signal of said oscillation means to convert the received radio-frequency signal to a first intermediate frequency signal;
   a frequency division means for dividing the signal frequency of said oscillation means by a factor of N;
   a second frequency conversion means for getting said first intermediate frequency signal and the output signal of said frequency division means to output a second intermediate frequency signal;
   a demodulation means for demodulating said second intermediate frequency signal; and
   a frequency conversion means for transmission for getting the output signal of said oscillation means and the output signal of said frequency division means to output radio-frequency signal for transmission;
   wherein the frequency division number N of said frequency division means and the frequency of the output signal of said oscillation means are predetermined so that a change in frequency of the output signal of said frequency division means due to a change in said frequency division number N by a first predetermined number is the same as the transmitting channel interval and this frequency division number causes said radio-frequency signal for transmission to be at a predetermined frequency, and wherein the frequency division number N of said frequency division means is predetermined so that a change in frequency of the output signal of said frequency division means due to a change in said frequency division number N by a second predetermined number is the same as the receiving channel interval, wherein said frequency division number differs from during transmission and during reception.

10. A transmitter-receiver according to claim 9 wherein a crystal oscillator is used as an oscillation means.

11. A transmitter-receiver according to claim 9 further comprising a frequency fine-tuning means for fine-tuning of an oscillation frequency of the oscillation means.

12. A transmitter-receiver according to claim 11 wherein the frequency fine-tuning means has a variable-capacitance semiconductor device and performs fine-tuning of oscillation frequency by applying a digital signal converted to an analog signal.

13. A transmitter-receiver that performs transmission and reception by selecting any of a plurality of equally set channels, comprising:
   an oscillation means for oscillating a signal at a certain frequency;
   a multiplication means for multiplying the output signal of the oscillation means by a factor of a predetermined multiplication number;
   a first frequency conversion means for getting a received radio-frequency signal an output signal of said multiplication means to convert the received radio-frequency signal to a first intermediate frequency signal;
   a first variable frequency division means for dividing the signal frequency of said oscillation means by a factor of N1;

a fixed frequency division means for dividing the output signal of said multiplication means by a factor of an integral number;

a second variable frequency division means for dividing the output of said fixed frequency division means by a factor of N2;

a second frequency conversion means for getting said first intermediate frequency signal and the output signal of said first variable frequency division means to output a second intermediate frequency signal;

a demodulation means for demodulating said second intermediate frequency signal; and a frequency conversion means for transmission for getting the output signal of said oscillation means and the output signal of said second variable frequency division means to output radio-frequency signal for transmission;

wherein the frequency division number N2 of said second variable frequency division means and the frequency of the output signal of said oscillation means are predetermined so that a change in frequency of the output signal of said second variable frequency division means due to a change in said frequency division number N2 by a second predetermined number is the same as the transmitting channel interval and this frequency division number causes said radio-frequency signal for transmission to be at a predetermined frequency, and wherein the frequency division number N1 of said first variable frequency division means is predetermined so that a change in frequency of the output signal of said first variable frequency division means due to a change in said frequency division number N1 by a first predetermined number is the same as the receiving channel interval, wherein the frequency division numbers of said first and second variable frequency division means differ from during transmission and during reception.

14. A transmitter-receiver according to claim 13 wherein a crystal oscillator is used as an oscillation means.

15. A transmitter-receiver according to claim 13 further comprising a frequency fine-tuning means for fine-tuning of an oscillation frequency of the oscillation means.

16. A transmitter-receiver according to claim 15 wherein the frequency fine-tuning means has a variable-capacitance semiconductor device and performs fine-tuning of oscillation frequency by applying a digital signal converted to an analog signal.

* * * * *